United States Patent
Meyer

[11] Patent Number: 5,215,374
[45] Date of Patent: Jun. 1, 1993

[54] THROTTLE ARRANGEMENTS FOR COLD FEED EXTRUDES

[75] Inventor: Paul Meyer, Ascona, Switzerland

[73] Assignee: Frenkel C-D Aktiengesellschaft, Basel, Switzerland

[21] Appl. No.: 691,268

[22] Filed: Apr. 25, 1991

[30] Foreign Application Priority Data

Apr. 19, 1991 [GB] United Kingdom ............ 9108489

[51] Int. Cl.$^5$ .................................. B29B 1/04
[52] U.S. Cl. ........................ 366/90; 425/145; 425/209
[58] Field of Search .............. 360/90, 89, 79, 80, 360/81, 97, 98, 99, 100, 322, 323, 324, 318; 425/135, 145, 205, 207

[56] References Cited

U.S. PATENT DOCUMENTS

| | | | |
|---|---|---|---|
| 4,304,054 | 12/1981 | Nauck | 366/90 |
| 4,538,917 | 9/1985 | Harms | 366/90 |
| 4,581,992 | 4/1986 | Koch | 366/90 |
| 4,960,328 | 10/1990 | Schumacher | 366/90 |
| 5,145,352 | 9/1992 | Capelle et al. | |
| 5,147,198 | 9/1992 | Capelle | |

*Primary Examiner*—Robert W. Jenkins
*Attorney, Agent, or Firm*—Gottlieb, Rackman & Reisman

[57] ABSTRACT

A single-rotor cold feed extruder having a barrel and a screw and incorporating a transfermix plasticizing/mixing section is disclosed. The extruder is provided with a fixed set of flow-interrupters/deflectors carried by the barrel and positioned in a circumferential cut in the screw downstream of the transfermix section. The extruder is characterized by radially movable throttle members which are located around the flow interrupters/deflectors so as to provide an increase of throughput for and improved quality of difficult-to-extrude compounds.

14 Claims, 4 Drawing Sheets

THROTTLE ARRANGEMENTS FOR COLD FEED EXTRUDES

BACKGROUND OF THE INVENTION

1. Technical Field

The present invention relates to cold feed rubber extruders.

2. Description of Related Art

Cold feed rubber extruders, generally comprising a feed-opening, a compression-section, a plasticizing section and an exit section leading to an extrusion head, have been replacing warm feed rubber extruders throughout the Industry, though for certain compounds and applications the latter still persist.

With advances in design, mainly in the plasticizing section, the range has been extended to include more rubber compounds which had been found difficult to extrude on account of high viscosity (Mooney values), nerve (natural rubber compounds), hardness, high filler-content or special sensitivity to heat build-up.

Such a plasticizing section has been the Transfermix (U.S. Pat. No. 2,744,287 Parshall & Geyer 1956, Re. No. 26,147 of 1967 or UK Pat. No. 842,692 Frenkel of 1956 or U.S. Pat. No. 4,136,969 Meyer of 1979 or U.S. Pat. No. 4,184,772, Meyer of 1979) having the generic feature that in a transfer-zone formed over a common length of screw and barrel, in the screw a helical groove varies in cross-section from full area to zero area and in the barrel the cross-section of an opposite handed helical groove varies from zero area to full area, whereby in the said transfer-zone the compound is transferred from the said screw into the said barrel, while being mixed and plasticized. The said plasticizing section may comprise only one such transferzone or more, where a second one is conversely adapted by way of changes in cross-sections of helices to effect a return-transfer from barrel to screw.

For a given cross-sectional area between the bottom of the screw-helix and that of the barrel helix, such a Transfermix geometry provides a uniform action of flow division and rearrangement, treating on one transfer each subdivision just once and none repeatedly, unlike other plasticizing systems, which operate non-uniformly to different degrees and are therefore less effective.

Mathematics can be developed to show that for the earlier (1956) generation of Transfermix having invariant numbers of helical grooves in each transfer-zone, this number is limited by the condition of maintaining continuity of transport by shear stress transfer in the rubber. Expressed simply, this means avoiding grooves which get too deep and narrow so that there can be no more forward transport in the bottoms of the grooves due to the relative rotation of the screw and barrel and the grooves are no longer self-cleaning.

This limitation is, to a large measure, overcome in the second (1979) generation of Transfermix, where the number of helical grooves varies inversely as between screw and barrel within the same transfer-zone, whereby the width/depth ratio of individual helical channels can be kept such that transport flow—and thereby the important practical feature of self-cleaning—is maintained while effecting a much more intense flow-division and rearrangement, which in equal intensity can be realized for any diameter of Transfermix. Hence the designation "Multi Cut Transfermix" and the considerable widening of its plasticizing action into the range of difficult-to-extrude compounds, as well as its solution of the scale-up problem, enabling an equal plasticizing action to be designed into any diameter of a range of extruders similar in outline dimensions, such as L/D ratio.

To quote numbers on the example of a 90 mm Transfermix: In the first generation the maximum number of helical grooves in both screw and barrel for an output typical for this size would be 4–6 in the screw and 4–6 in the barrel, making 16 to 36 subdivisions, whereas the Multi Cut Transfermix would bring about 40 to 80 subdivisions.

This concentrated action, compared to other types of plasticizing section, has for both generations led to transfer-zones of a length of 1 to 1.5 screw diameters, which has allowed "easy to extrude" compounds to be plasticized homogeneously at relatively low temperatures with throughput restricted by the die-resistance only, while for more "difficult" compounds various degrees of throttling in addition to the die-resistance bring uniformity into the plasticization, thus greatly extending the range of compounds.

As a Transfermix plasticizing section, on account of having opposite handed helices in screw and barrel, exerts a powerful pumping effect in both screw and barrel especially on partially plasticized and hence tough media, giving rise to a multiple of the normal throughput, a high degree of throttling has been found necessary, up to restricting 95% of the flow—area.

A useful device for doing this has been a set of radially arranged conically shaped pins, set in a cut in the screw following a Transfermix section, which when moved radially inwards to almost touch the bottom of the cut-out in the screw, would reduce the projected area of flow down to even less than 5% and when moved radially outwards, would leave this projected area fully open.

However, it was found that when such a throttle was partially closed to different degrees, it would produce different actions: At first it would increase the forward transport by stopping the rotation of an outer ring of the material which on being gripped by the rotating screw would set up a local pressure-increase. Only when inserted more deeply would it start to throttle, but accompanied by a kneading action introducing non-uniformities over the depth of the screw.

Another disadvantage noted in the compression-section as an area serving a Transfermix plasticising section has been the following:

According to experience with Transfermix systems gained particularly on tough (NR) and highly loaded compounds, a plain screw—compression-section leads to very high torques on the screw by leaving practically the total work of plasticization to the Transfermix-section—so much so that in certain cases a drive installed for normal compounds was stopped. Some relief was obtained by notching the screw flights over a part of their depth and at a flight-angle higher than that of the groove, not only in the entry-zone, where this is a useful measure for gripping the feed, but additionally up to about three-quarter way into the compression zone, which had a preplasticizing effect and made the drive adequate again.

This, however, reduced the pressure-build up and could not produce a pre-plastication extending over the full depth of the screw channels.

Of other known plasticizing systems, especially the type called Pin Barrel Extruder (U.S. Pat. No. 4,178,104 Menges et al of 1979 corrected to U.S. Pat. No. 4,199,263 of 1980) has found wide application in the last 15 years. In this, at various positions along the length of a screw, rings of radially arranged flow-interruptors, mostly pins of circular cross-section, extend from the barrel into corresponding circular cuts in the screw, reaching to the bottom of the helical grooves. In each such ring, the diameter of the pins must be sufficient to withstand the considerable forces exerted by the flow of the rubber and the number of pins is limited by the fact that they must avoid throttling the forward flow.

With rotation and corresponding forward transport of compound, these pins, which loosely fit into the cuts in the screw, exert a kneading action which, on account of the above limitations on diameter and number of pins, is non-uniform around the circumference.

This kneading action is repeated in a number of so-called pin-planes, each at least one pitch-length of the screw away from the next, and has been used for plastification in extruders up to large diameters. The number of such pin-planes ranges from about 6 for easy-to-plasticize compounds to 10 or more for more difficult compounds, where excessive temperature development has generally limited the application of such extruders at the difficult end of the range of compounds.

It can be observed that in a Pin Plane, some elements of the flow of material are being deformed, rather than sliced, circumferentially while others slip undeformed between the pins, whereas in a Transfermix this flow is being sliced circumferentially into elements, each one a part of a thin shell, of substantially equal area and distributed over the radial depth of the screw in an orderly fashion. The deforming action in a pin plane, having regard to the necessarily small number of pins around the circumference in order to avoid throttling the flow, can not be anything like as concentrated as in any Transfermix that way, nor can this be lengthwise of the screw on account of the intervening lengths of screw between the pin-planes.

In each pin plane, however, the rotation of the compound is reduced relative to that of the screw so that on being gripped again by the rotating screw thereafter, the pressure-build-up is increased locally, and forward transport tends to be improved.

It is an object of this invention to provide, in combination with a Transfermix plasticizing section, a means for effecting in the compression zone a pre-plasticizing effect which extends over the full depth of the helical grooves.

It is a further object of this invention that such a preplasticizing effect be achieved without a reduction of the pressure build-up in the compression-zone.

It is a further object of this invention to provide a means for upgrading and where desired, shortening existing pin-barrel extruders to alleviate a prior limitation of compound- or output-range.

It is a further object of this invention to provide a throttling means for insertion into an exit-section of a screw which exerts a flow-interrupting and kneading effect over the whole depth of the helical flow-channel.

SUMMARY OF THE INVENTION

In order to achieve these objects, this invention provides:

An extruder with a screw rotatably mounted and driven to coact with a barrel, said extruder comprising an inlet, a compression section, a plasticizing section and an exit-section, the said plasticizing section embodying a Transfermix geometry according to U.S. Pat. No. 2,744,287 of 1956, Re. No. 26,147 of 1967 or to U.S. Pat. No. 4,136,969 of 1979 or to U.S. Pat. No. 4,184,772 of 1979, the said plasticizing section having the generic feature that following said compression-section, a helical groove in the screw varies in cross-section from full area to zero area and in a substantially corresponding length of the barrel the cross-section of an opposite-handed helical groove varies from zero area to full area, whereby in operation the flowing material is transferred from the screw to the barrel while being mixed and plasticized, the said screw outside of the said plasticising section comprising a circumferential cut extending substantially to the bottom of the said helical groove, and the said barrel at the position of the said cut having joined with it so as to be immobile relative to it a set of flow interruptors, substantially equally spaced around its circumference, and extending substantially to the bottom of the said helical groove, the said flow interruptors loosely fitting into the said cut in the screw.

In an embodiment of the said invention, the said cut in the screw in which there are the said flow-interruptors joined to the said barrel may be arranged in the said compression-zone to act as a preplasticizing means acting over the whole depth of the helical screw.

In an embodiment of the said invention, there may be provided in the said compression-zone a plurality of the said cuts in the said screw and spaced longitudinally from each other, each with a set of flow interruptors joined to the said barrel and loosely fitting into the said cuts, to operate as a said preplasticising means.

In an embodiment of this invention, the said flow-interruptors may be pins of substantially circular cross-section each arranged radially of the said screw.

In an embodiment of this invention, the said flow-interruptors may be vanes adapted to substantially redirect the flow of material.

In an embodiment of this invention, the said flow-interruptors may be vanes with cutting edges directed into the flow for promoting comminution of parts of the flow with minimum mechanical energy and thus heat-input, preparatory to plasticization.

In an embodiment of this invention, the said cut in the said screw may be provided in the exit-section of the said screw, the said flow-interruptors be arranged radially of the said screw-axis and there being provided around the said flow-interruptors throttling-members capable of radial adjustment for minimum throttling when positioned radially out and maximum throttling when positioned radially in. The said throttling-members may closely fit the said flow-interruptors so as to exert a cleaning action on the said flow-interruptors when being moved inwards, especially as part of a cleaning cycle at the end of operations. Furthermore, the said flow-interruptors may be round pins and the said throttling members may be round pins with conical ends so that when moved radially in these radial ends substantially close the flow-cross-section of the said screw.

BRIEF DESCRIPTION OF THE DRAWINGS

The invention will now be described in some detail with reference to the accompanying drawing in which.

DESCRIPTION OF A PREFERRED EMBODIMENT

Figure 1:
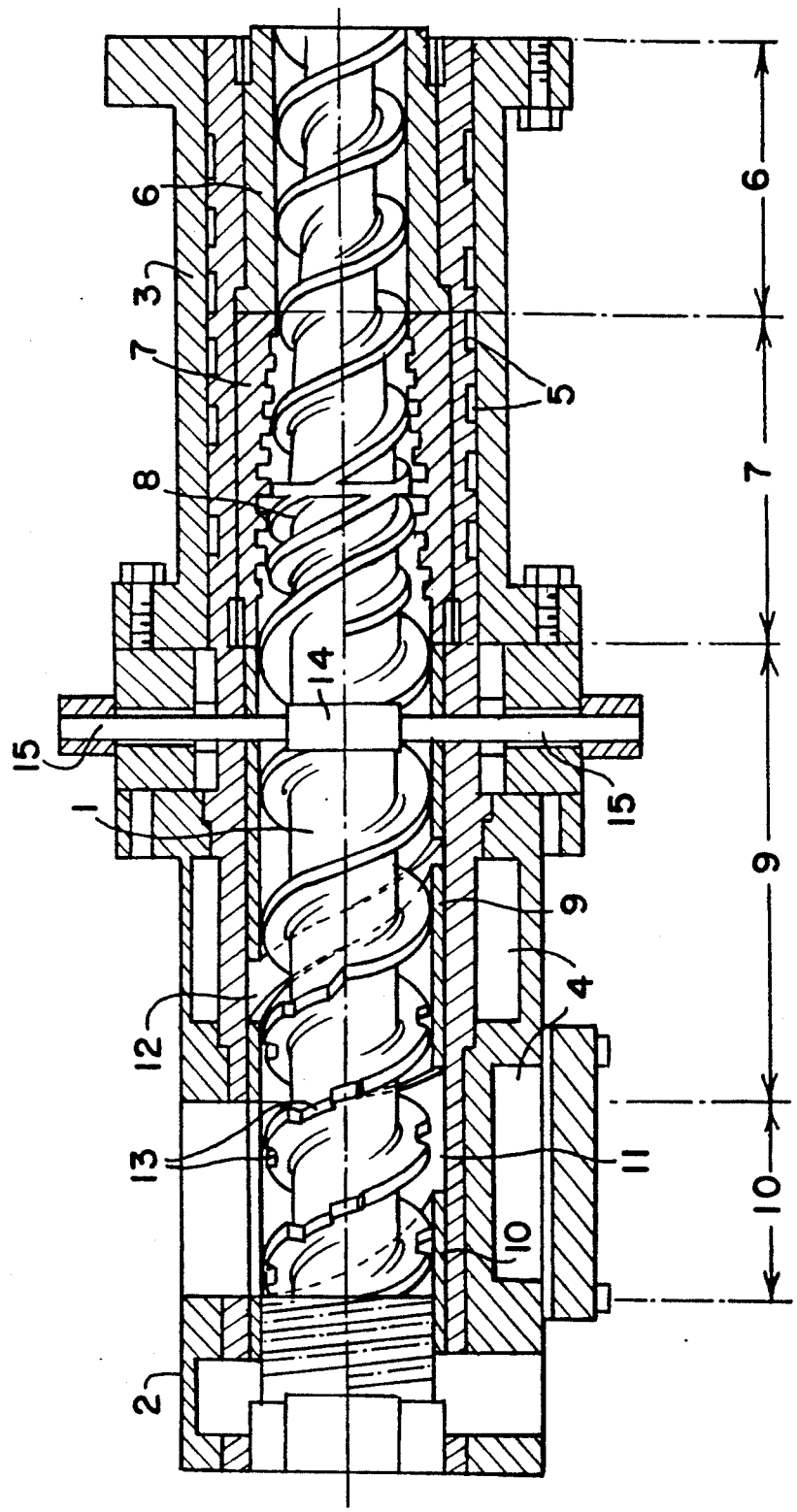
FIG. 1 is a sectional elevation embodying one pin-plane at the end of the compression-section just before the Transfermix plasticizing section.

In FIG. 1, the extruder-screw 1 is shown unsectioned in the sectioned housing 2 of the feed inlet 13, the sectioned compression-section and the sectioned extruder barrel 3. The housings are shown with passages 4 and 5 respectively for a heating/cooling fluid. The components adjacent to the screw are formed by sleeves: At the outlet end there is a plain cylindrical sleeve 6. There is a Transfermix sleeve 7 in the plasticizing/mixing section of the extruder for cooperating with a corresponding Transfermix section 8 of the screw (U.S. Pat. Nos. 4,136,969 and/or 4,184,772). In the compression section there is sleeve 9 and under the inlet opening there is sleeve 10. The feed-pocket 11 in sleeve 10 extends under the inlet opening and runs into the spiral undercut 12 in sleeve 9 where the screw enters the barrel and carries on with its continuously reducing width for 360° round the screw, to end just before the end of the compression section,—as shown in U.S. Pat. No. 4,462,692.

At least over the length of the inlet-opening 10, but as shown, also extending over a part of the length of the compression section, the extruder screw flights are provided with notches 13 at an angle considerably greater than the lead-angle of the screw,—preferably at a lead-angle of 45°, as against a normal flight lead-angle between 20° and 25°. These notches may start at depths of about half the depth of the flight, and then, especially in the compression-zone, reduce gradually in depth to finally run out, which makes a reduction in volume along the length of the screw parallel to that provided by the spiral undercut in the compression section. In practice for example a length of notch of 20–30 mm measuring along the length of the screw-flight and spaced at the same distance, has been found effective. The main function of the notches is to provide edges to grip the fresh feed so that this is pulled into the screw strictly in ratio to the speed of rotation.

However, the notches, in cooperation with the undercut, also provide a pre-plasticizing action for tough or hard compounds, thereby providing a contiguous mass to form the squash-back and to fill the spaces between pieces of unplasticized feed.

The circumferential cut 14 in the flights of screw 1, with its radially arranged row of pins 15 fixed in housing 2 is here shown at the end of the compression-section. It could also be arranged at a position nearer the inlet, especially if instead of round pins the flow interrupting means were to be of a different shape, as indicated later by way of example, and is intended to be an improvement on the function of the above-described notches in the screw-flights insofar as they extend into the compression-zone.

Figure 2:
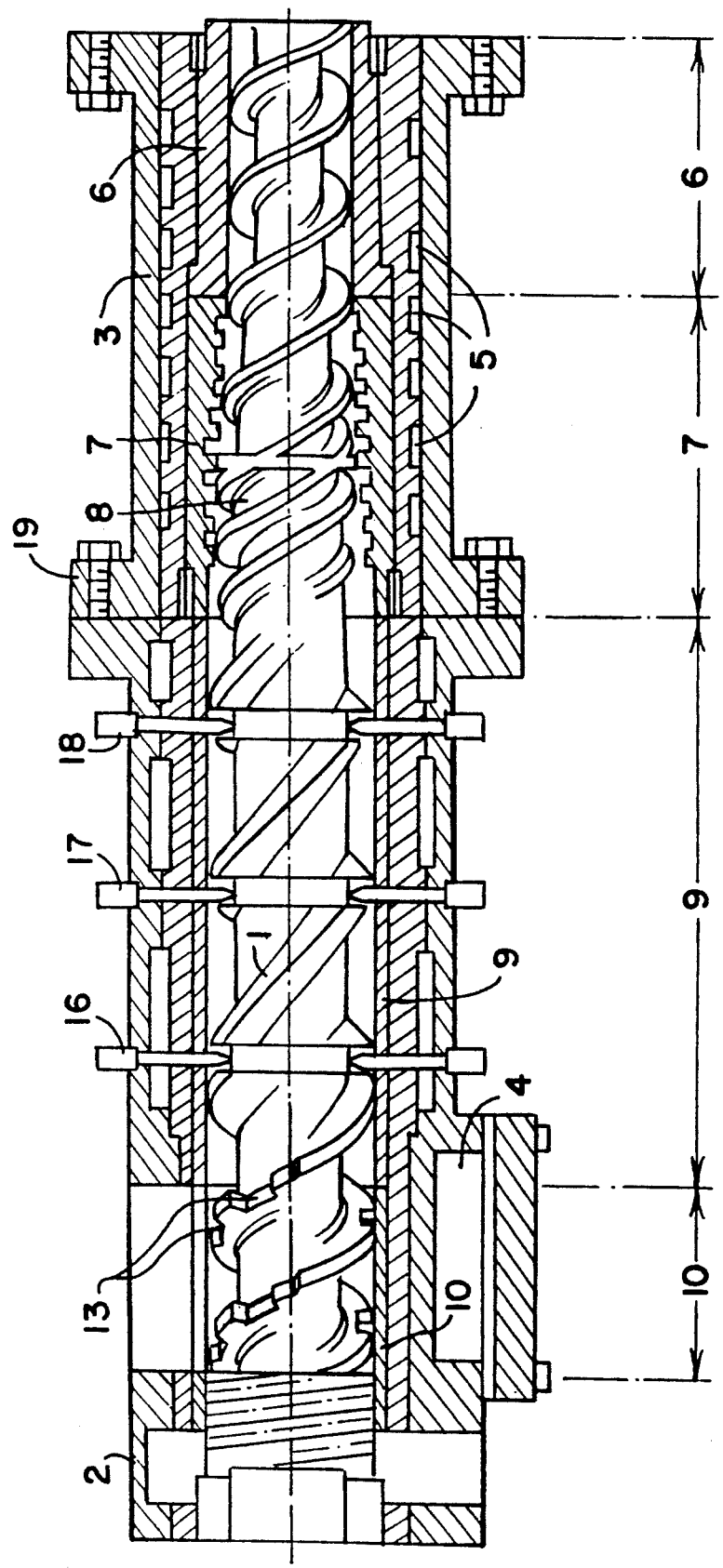
FIG. 2 is a sectional elevation of a pin-barrel extruder cut short after 3 pin-planes and provided with a Transfermix plasticizing section.

In FIG. 2, like numerals indicating like parts as in FIG. 1, there is shown a pin-barrel extruder as known in the art, with the usual minimum of 6 pin-planes reduced to three indicated at 16, 17 and 18, and having a Transfermix plasticizing section 7 flanged at 19 to what was originally the pin-barrel housing, suitably adapted. Similarly, at that position, the original pin barrel screw will have the Transfermix screw part joined to it. It must be noted specifically that this Transfermix section could be of the first generation U.S. Pat. No. 2,744,287 of 1956, Re. No. 26,147 of 1967 just as well as of the second generation Transfermix because even this mixes better than the several pin-planes which the original pin barrel extruder may have been shortened by.

However, the three pin-planes will clearly improve the preplasticizing action over the notches in the screw-lands as indicated in FIG. 1.

Figure 3:
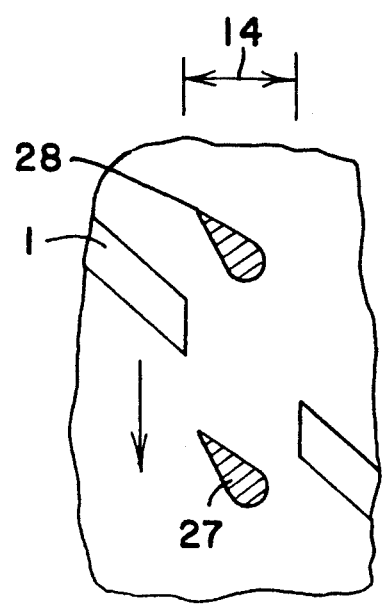
FIG. 3 is a section of a developed cross-sectional view showing by way of example an alternative section of a flow-interruptor.

FIG. 3 shows an alternative example, out of many possible ones, of a different cross-section of flow-interruptors for use in the example of FIGS. 1 and 2, especially in a pin-plane near the entry. The pins 27 are provided with a cutting edge 28, to provide a form of comminution for hard or tough compounds fed as strip or sheet, with a minimum of mechanical work input, and extending over the whole depth of the screw-channel.

One or two pin-planes of such 'cutting' interruptors following shortly after th inlet will provide a kind of internal pelletizing action which enables the Transfermix plasticizing section to operate with less torque on the drive.

Figure 4:
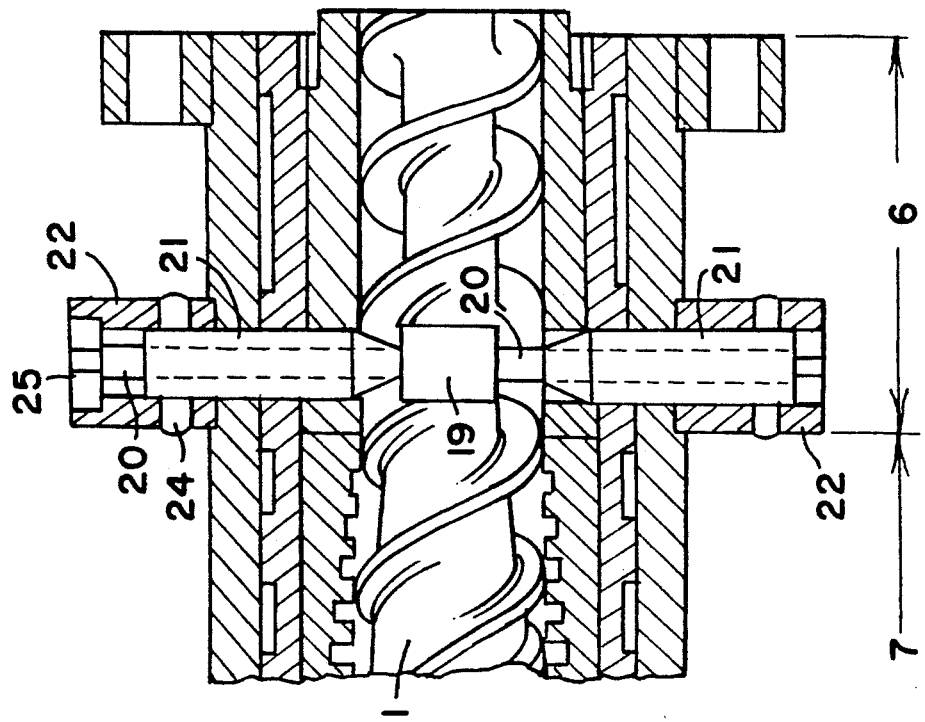
FIG. 4 is a sectional elevation of a throttling means embodying a ring of pins following a Transfermix plasticizing section.

FIG. 4, again like numerals indicating like parts, shows a cut 19 in the screw 1 with 8 pins 20 in it as interruptor parts, immediately following a Transfermix plasticizing section, in the end-section 6 of the extruder. According to the invention, these pins 20 are immovable relative to the barrel, being held inside bores in throttle-pins 21 with conical ends, shaped to substantially close the annular space of cut 19 when these throttle pins are moved radially inwards. This is shown above the horizontal centre-line. Below the centre-line the throttle-pin is shown moved out.

Figure 5:
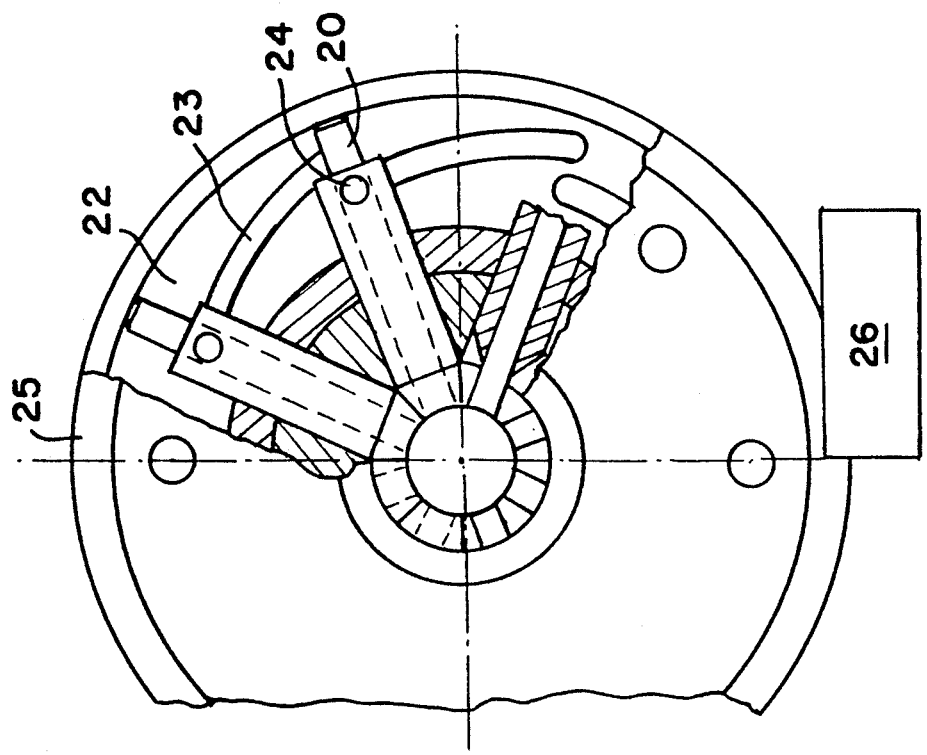
FIG. 5 is a part-sectional side-elevation of the throttling means shown in FIG. 3.

FIG. 5 is an outside view of the end-flange of the extruder-barrel, partly sectioned in the cut 20 to show the throttle-pins in outside view above the centre-line, and partly sectioned also through one of the throttle-pins below the centre-line where this is withdrawn.

The means for moving the throttle-pins in and out are two annular plates 22 rotatably mounted on the barrel 2, with curved slots 23 engaged by round knobs 24 on each of the throttle-pins. The annular plates 22 are held together by an outer ring 25 which, like each of the plates, is made in two halves so that the whole device can be assembled and bolted together from the outside. Means for rotating the annular plates through one eigths of a circle for moving the throttle-pins in and out and for arresting these at any position in between are indicated diagrammatically at 26.

In operation, the extruder is run with the throttle open which covers a range of normally extrudable compounds. For more difficult compounds, insufficiently worked extrudate with cooler lumps will be transported at a higher output. Closing the throttle will make the extrudate smooth and uniform to the required degree. For tough, nervy and highly-loaded compounds which cannot be plasticized on other extruders, this may have to shut off up to 95% of the flow-area while still providing good throughputs for the size of extruder.

The advantage provided by the flow-interruptor pins over the throttle with radially movable pins only is that of uniform action over the depth of the screw-flight whether the throttle-pins are in or out, as well as an additional pressure-generation with positive effect on the output.

In a recent test on a 95 mm Transfermix this has amounted to over 10% on a nervy compound requiring the throttle-pins to be about 85% in, at the highest screw-speed previously possible, with a reduced extrusion temperature. Running at a higher speed to come up to the permitted extrusion temperature provided another 12% of output, making an improvement of 20% at if anything better quality extrudate due to this invention.

While the Transfermix plasticizing section is self-cleaning for any but smeary compounds which would not clean on any single-screw extruder, this throttle with flow-interruptor pins according to this invention can also be made self-cleaning at the end of a run: After having been opened to allow the Transfermix to self-clean, it can then be shut gradually to expel compound caught between the throttle-pins and to scrape compound off the interruptor pins. As is known from pin-barrel practice, already plasticized compound tends to stick on the trailing side of the pins expecially in pin-planes near the screw-end. On the throttle being re-opened gradually, the compound thus released gets caught by the screw and moved out in small rolled lumps.

Figure 6:
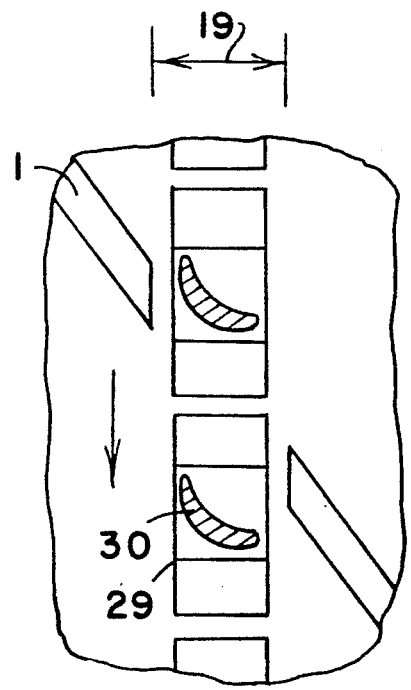
FIG. 6 is a section of a developed cross-sectional view of a throttle showing an alternative sectional shape of a throttling member and an alternative shape of a flow-interruptor.

FIG. 6, shows an alternative throttle-pin of rectangular shape 29, with the interruptor-means being shaped as a curved vane 30, adapted to deflect the flow of material so as to maximize the increase of pressure on the compound being gripped again by the rotating screw-, —analogous to a set of stator-vanes in an axial flow pump. The rectangular cross-section of the throttling-pins provides a more intense throttling-action by providing flow-channels of a length almost equal to width of the cut in the screw.

Having now described this invention by way of example and in some detail, what I claim is:

1. An extruder having a screw rotatably mounted within a barrel, said screw and said barrel coacting to at least partially define a transfermix plasticizing section for transferring material between said screw and said barrel while said material is being mixed and plasticized, a portion of said screw located outside of said plasticizing section including a circumferential cut having a depth extending substantially to at least the depth of a helical groove in said screw, said extruder further including a set of flow interrupters carried by said barrel at a position corresponding to said cut in said screw, said flow interrupts being immobile relative to said barrel and equally spaced around the circumference of said screw, each of said flow interrupters extending to a depth substantially equal to the depth of said circumferential cut, and a throttle carried by said barrel at said position for controlling the flow of material through said barrel.

2. The extruder set forth in claim 1 wherein said throttle comprises a plurality of throttle members, said throttle members being movable relative to said barrel in a radial direction.

3. The extruder set forth in claim 2, wherein each of said flow interrupters comprises a pin, and wherein each of said throttle members is located around a respective pin.

4. The extruder set forth in claim 3 wherein each of said throttle members has an inside dimension slightly greater than the corresponding outside dimension of a respective pin.

5. The extruder set forth in claim 3 wherein each of said throttle members has a round tubular cross-section taken in a direction transverse to a line extending radially of said barrel and a conical end portion.

6. The extruder set forth in claim 3 wherein each of said throttle members has a rectangular tubular cross-section taken in a direction transverse to a line extending radially of said barrel and an angled end portion.

7. The extruder set forth in claim 2 further including means for radially moving said throttle members between a minimum throttle position and a maximum throttle position.

8. An apparatus for extruding material, said apparatus comprising:
   a tubular barrel, said barrel having a first portion at least partially defining a compression section and a second portion longitudinally spaced from said first portion, said section portion at least partially defining a transfermix section;
   a screw rotatably mounted in said barrel;
   at least one helically arranged flight extending longitudinally along said screw;
   a circumferential cut in said flight;
   a plurality of pins carried by and radially immovable relative to said barrel and extending radially inwardly from said barrel toward said circumferential cut at a position corresponding to said cut; and
   throttle means carried by said barrel at said position for controlling the flow of material through said barrel.

9. The extruder set forth in claim 8 wherein said throttle means comprises a plurality of throttle members, said throttle members being movable relative to said barrel in a radial direction.

10. The extruder set forth in claim 9 wherein each of said throttle members is located around a respective pin.

11. The extruder set forth in claim 10 wherein each of said throttle members has an inside dimension slightly greater than the corresponding outside dimension of a respective pin.

12. The extruder set forth in claim 10 wherein each of said throttle members has a round tubular cross-section taken in a direction transverse to a line extending radially of said barrel and a conical end portion.

13. The extruder set forth in claim 10 wherein each of said throttle members has a rectangular tubular cross-section taken in a direction transverse to a line extending radially of said barrel and an angled end portion.

14. The extruder set forth in claim 9 further including means for radially moving said throttle members between a minimum throttle position and a maximum throttle position.

* * * * *